US008321810B2

(12) United States Patent
Heintze

(10) Patent No.: US 8,321,810 B2
(45) Date of Patent: Nov. 27, 2012

(54) CONFIGURING AN ADAPTIVE INPUT DEVICE WITH SELECTED GRAPHICAL IMAGES

(75) Inventor: R. Siegfried Heintze, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 235 days.

(21) Appl. No.: 12/433,790

(22) Filed: Apr. 30, 2009

(65) Prior Publication Data

US 2010/0281410 A1 Nov. 4, 2010

(51) Int. Cl.
*G06F 3/048* (2006.01)
*G06F 3/02* (2006.01)
*G09G 5/00* (2006.01)

(52) U.S. Cl. .................. 715/835; 715/769; 345/172

(58) Field of Classification Search ............ 715/769, 715/799, 810, 826, 835, 838, 840, 846–847, 715/866, 745; 345/172, 174, 170
See application file for complete search history.

(56) References Cited

U.S. PATENT DOCUMENTS

| 5,818,361 | A | 10/1998 | Acevedo |
| 6,573,913 | B1* | 6/2003 | Butler et al. ............... 715/761 |
| 7,092,702 | B2* | 8/2006 | Cronin et al. .............. 455/418 |
| 7,921,366 | B2* | 4/2011 | Komura et al. ............. 715/745 |
| 2002/0063691 | A1* | 5/2002 | Rogers et al. .............. 345/168 |
| 2008/0131184 | A1* | 6/2008 | Brown et al. ............... 400/490 |
| 2009/0135030 | A1* | 5/2009 | Ron et al. ..................... 341/26 |
| 2009/0183098 | A1* | 7/2009 | Casparian et al. .......... 715/765 |
| 2010/0231527 | A1* | 9/2010 | Fibaek ......................... 345/173 |

* cited by examiner

*Primary Examiner* — Omar Abdul-Ali
*Assistant Examiner* — Andrew Tank
(74) *Attorney, Agent, or Firm* — Alleman Hall McCoy Russell & Tuttle LLP

(57) ABSTRACT

One exemplary system for configuring an adaptive input device includes a display and an adaptive input device having a plurality of depressible buttons. The system also includes a computing device operatively coupled to the display and the adaptive input device. The computing device includes a menu module to display a plurality of graphical images on the display, each graphical image associated with a computing function. The computing device also includes a detection module to detect a selected graphical image, from the plurality of graphical images, for display on a depressible button of the adaptive input device. The computing device also includes a presentation module to visually present the selected graphical image on the depressible button.

18 Claims, 8 Drawing Sheets

FIG. 5
COMPUTER MOUSE MOVEMENT
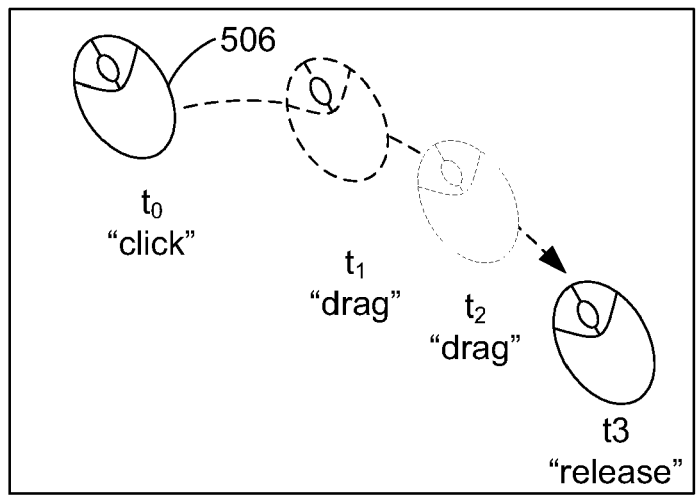
DISPLAY
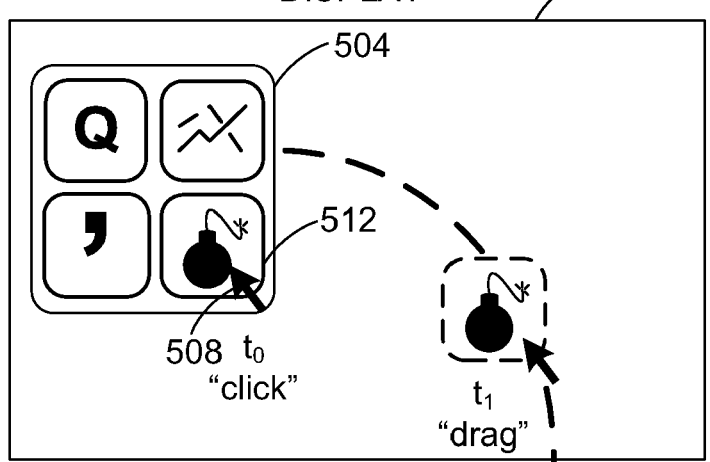
ADAPTIVE KEYBOARD
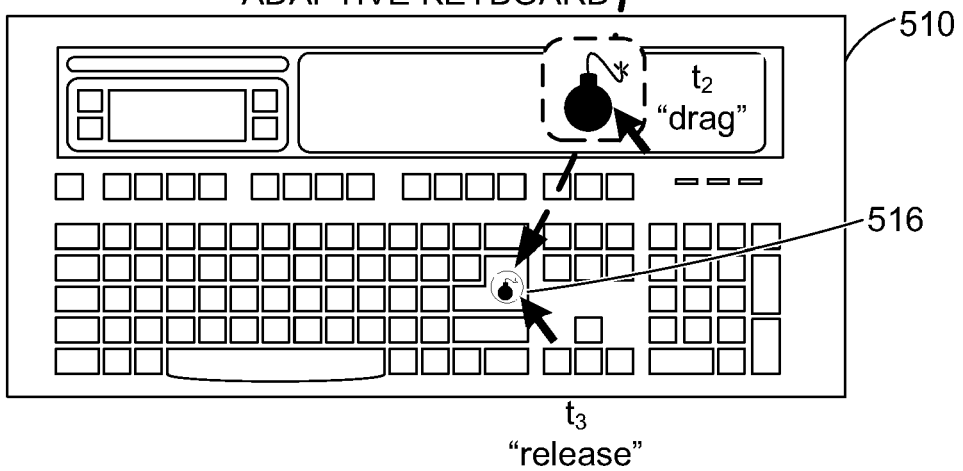

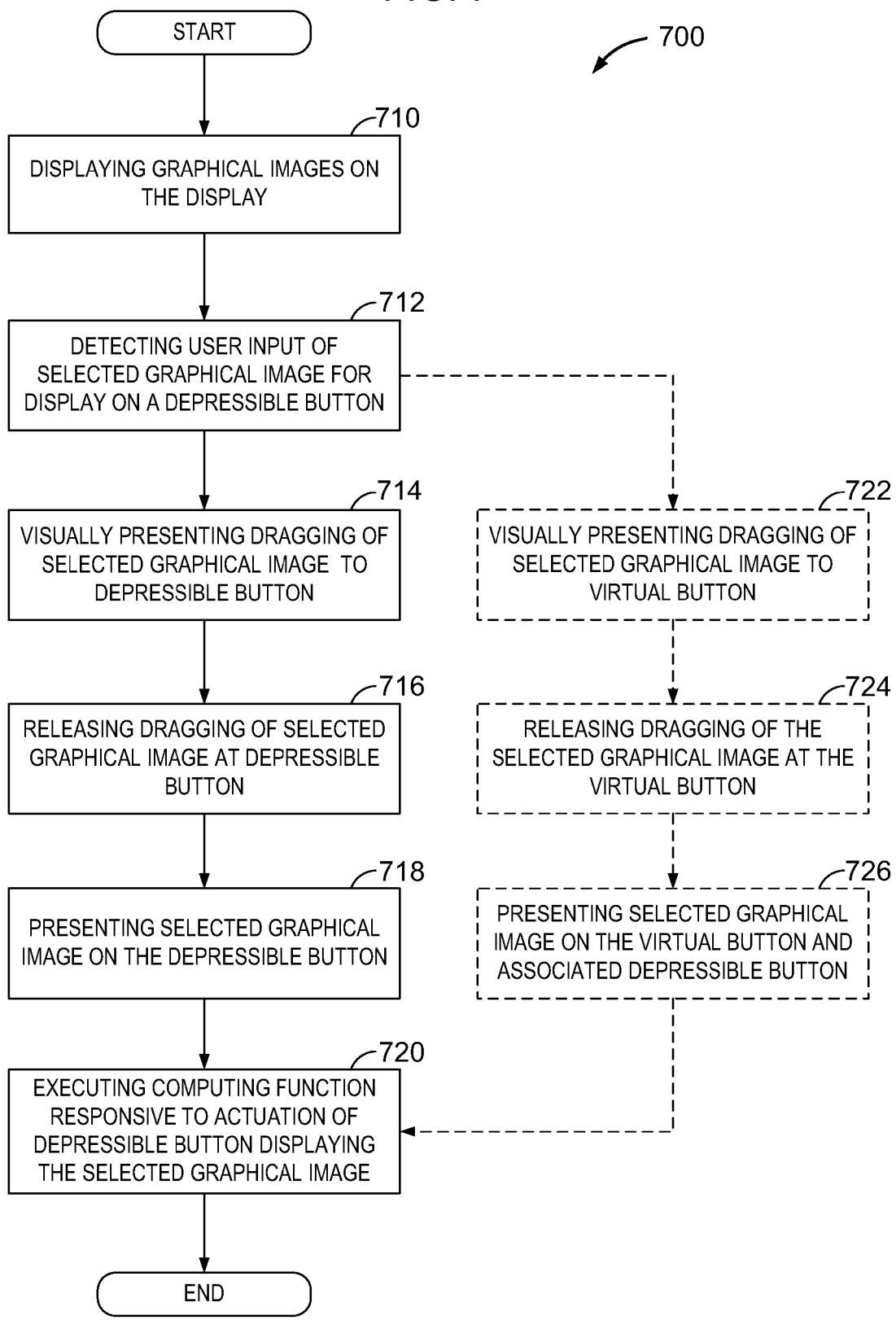

CONFIGURING AN ADAPTIVE INPUT DEVICE WITH SELECTED GRAPHICAL IMAGES

BACKGROUND

Computing systems can be used for work, play, and everything in between. To increase productivity and improve the user experience, attempts have been made to design input devices that offer the user an intuitive and powerful mechanism for issuing commands and/or inputting data.

SUMMARY

One exemplary system for configuring an adaptive input device includes a display and an adaptive input device having a plurality of depressible buttons. The system also includes a computing device operatively coupled to the display and the adaptive input device. The computing device includes a menu module to display a plurality of graphical images on the display, where each graphical image is associated with a computing function. The computing device also includes a detection module to detect a selected graphical image from the plurality of graphical images, for display on a depressible button of the adaptive input device. The computing device also includes a presentation module for visually presenting the selected graphical image on the depressible button.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 somewhat schematically shows the dragging of a graphical image from a display to an adaptive input device, via a cursor input.

FIG. 7 is a flowchart illustrating an exemplary method for configuring an adaptive input device.

DETAILED DESCRIPTION

The present disclosure is related to an adaptive input device that can provide input to a variety of different computing systems. The adaptive input device may include one or more physical or virtual controls that a user can activate to effectuate a desired user input. The adaptive input device is capable of dynamically changing its visual appearance to facilitate user input. As a non-limiting example, the adaptive input device may dynamically change the appearance of one or more buttons. The visual appearance of the adaptive input device may be dynamically changed according to user preferences, application scenarios, system scenarios, etc., as described in more detail below.

An adaptive input device may be operatively coupled (e.g., wired, wireless) to a computing device, and the computing device may be operatively coupled to a display (e.g., computer monitor) configured to display graphical images (e.g., icons). As explained in more detail below with reference to FIGS. 3-7, the display can be used to present a menu of graphical images. A user may use the menu to select which graphical images are displayed on which portions of the adaptive input device. As an example, a graphical image may be selected and displayed on a particular button of the adaptive input device, thus linking that button to a computing function associated with the selected graphical image. In this way, a user may customize the look and functionality of the adaptive input device. In some embodiments, a user may drag graphical images from the menu presented on the display to selected portions of the adaptive input device. Such dragging from the display to the adaptive input device may visually confirm the customization process, thus making the customization process more intuitive and flexible.

Figure 1A:
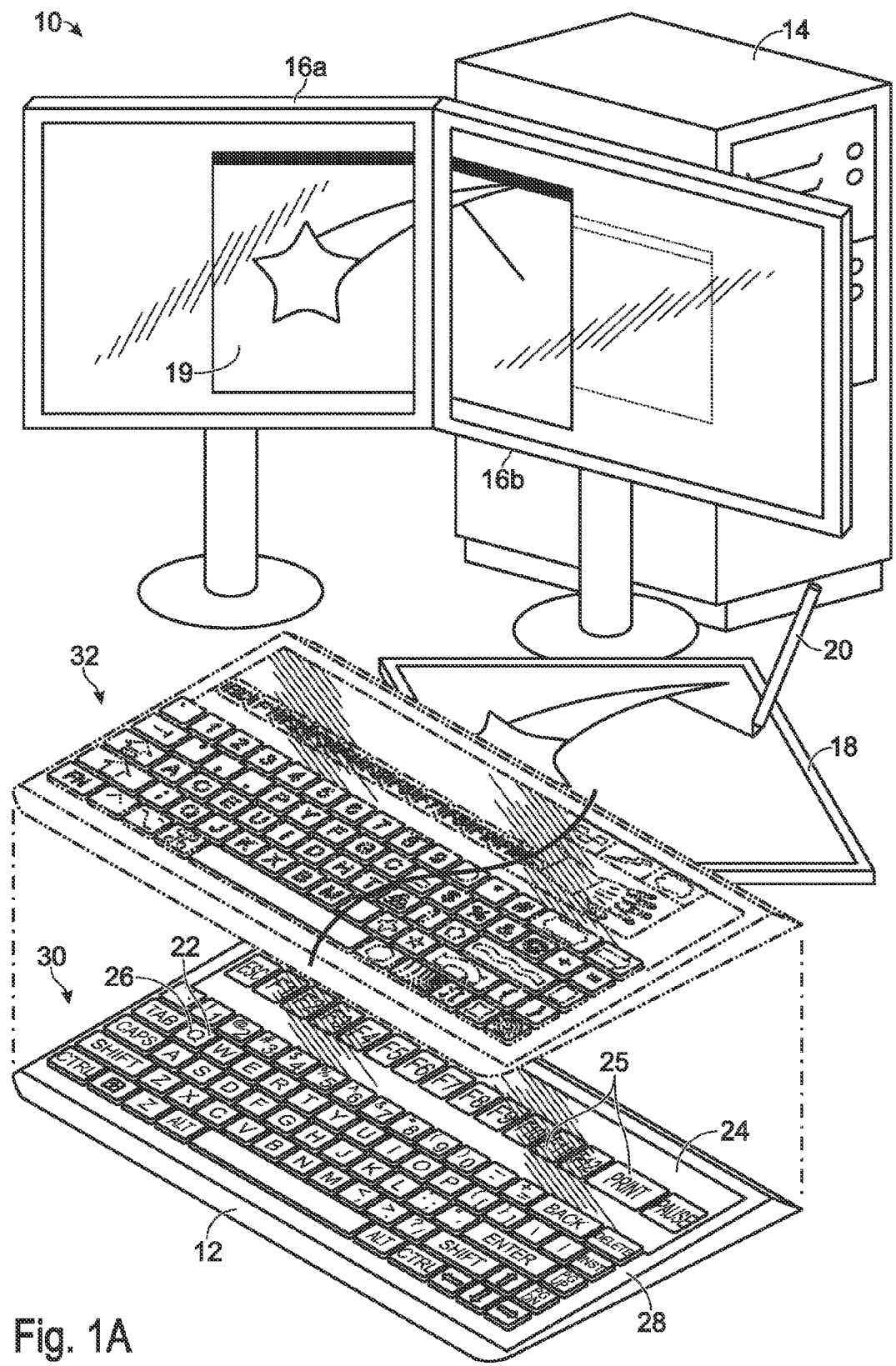
FIG. 1A illustrates a system including an adaptive input device in accordance with an embodiment of the present disclosure.

FIG. 1A shows a non-limiting example of a computing system 10 including an adaptive input device 12, such as an adaptive keyboard, with a dynamically changing appearance. The adaptive input device 12 is shown connected to a computing device 14. The computing device may be configured to process input received from adaptive input device 12. The computing device may also be configured to dynamically change an appearance of the adaptive input device 12.

Computing system 10 further includes monitor 16a and monitor 16b. While computing system 10 is shown including two monitors, it is to be understood that computing systems including fewer or more monitors are within the scope of this disclosure. The monitor(s) may be used to visually present visual information to a user.

Computing system 10 may further include a peripheral input device 18 receiving user input via a stylus 20, in this example. Computing device 14 may process an input received from the peripheral input device 18 and display a corresponding visual output 19 on the monitor(s). While a drawing tablet is shown as an exemplary peripheral input device, it is to be understood that the present disclosure is compatible with virtually any type of peripheral input device (e.g., keyboard, number pad, mouse, track pad, trackball, etc.).

In the illustrated embodiment, adaptive input device 12 includes a plurality of depressible keys (e.g., depressible buttons), such as depressible key 22, and touch regions, such as touch region 24 for displaying virtual controls 25. The adaptive input device may be configured to recognize when a key is pressed or otherwise activated. The adaptive input device 12 may also be configured to recognize touch input directed to a portion of touch region 24. In this way, the adaptive input device 12 may recognize user input.

Each of the depressible keys (e.g., depressible key 22) may have a dynamically changeable visual appearance. In particular, a key image 26 may be presented on a key, and such a key image may be adaptively updated. A key image may be changed to visually signal a changing functionality of the key, for example.

Similarly, the touch region 24 may have a dynamically changeable visual appearance. In particular, various types of touch images may be presented by the touch region, and such touch images may be adaptively updated. As an example, the touch region may be used to visually present one or more different touch images that serve as virtual controls (e.g., virtual buttons, virtual dials, virtual sliders, etc.), each of which may be activated responsive to a touch input directed to that touch image. The number, size, shape, color, and/or other aspects of the touch images can be changed to visually signal changing functionality of the virtual controls. It may be appreciated that one or more depressible keys may include touch regions, as discussed in more detail below.

The adaptive keyboard may also present a background image 28 in an area that is not occupied by key images or touch images. The visual appearance of the background image 28 also may be dynamically updated. The visual appearance of the background may be set to create a desired contrast with the key images and/or the touch images, to create a desired ambiance, to signal a mode of operation, or for virtually any other purpose.

By adjusting one or more of the key images, such as key image 26, the touch images, and/or the background image 28, the visual appearance of the adaptive input device 12 may be dynamically adjusted and customized. As non-limiting examples, FIG. 1A shows adaptive input device 12 with a first visual appearance 30 in solid lines, and an example second visual appearance 32 of adaptive input device 12 in dashed lines.

The visual appearance of different regions of the adaptive input device 12 may be customized based on a large variety of parameters. As further elaborated with reference to FIG. 1B, these may include, but not be limited to: active applications, application context, system context, application state changes, system state changes, user settings, application settings, system settings, etc.

Figure 1B:
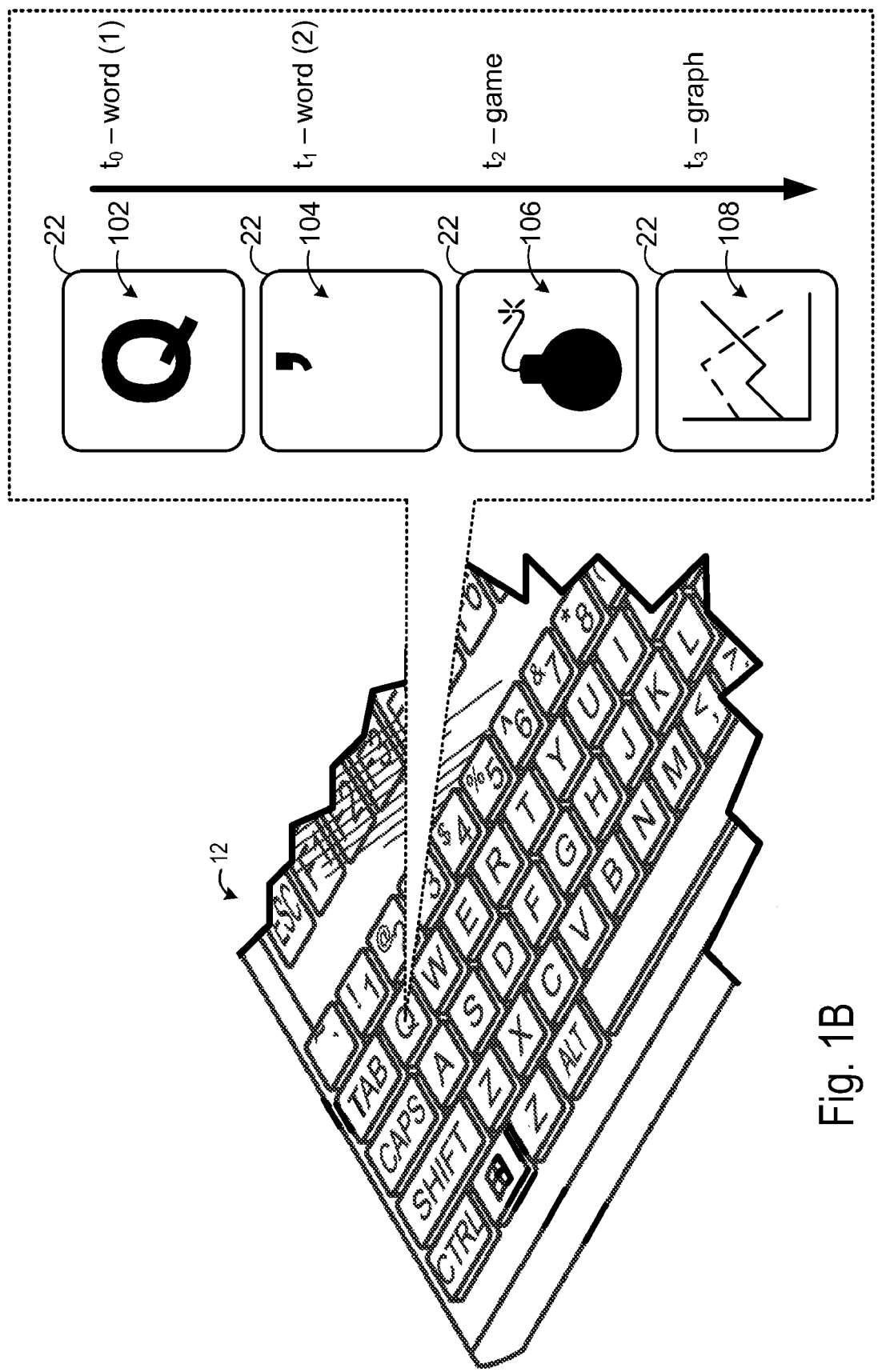
FIG. 1B illustrates dynamic updates to the visual appearance of the adaptive input device of FIG. 1A.

In one example, if a user selects a word processing application, the key images (e.g., key image 26) may be automatically updated to display a familiar QWERTY keyboard layout. Key images also may be automatically updated with icons, menu items, etc. from the selected application. For example, when using a word processing application, one or more key images may be used to present frequently used word processing operations such as "cut," "paste," "underline," "bold," etc. Furthermore, the touch region 24 may be automatically updated to display virtual controls tailored to controlling the word processing application. As an example, at $t_1$, FIG. 1B shows depressible key 22 of adaptive input device 12 visually presenting a Q-image 102 of a QWERTY keyboard. At $t_1$, FIG. 1B shows the depressible key 22 after it has dynamically changed to visually present an apostrophe-image 104 of a Dvorak keyboard in the same position that Q-image 102 was previously displayed.

In another example, if a user selects a gaming application, the depressible keys and/or touch region may be automatically updated to display frequently used gaming controls. For example, at $t_2$, FIG. 1B shows depressible key 22 after it has dynamically changed to visually present a bomb-image 106.

As still another example, if a user selects a graphing application, the depressible keys and/or touch region may be automatically updated to display frequently used graphing controls. For example, at $t_3$, FIG. 1B shows depressible key 22 after it has dynamically changed to visually present a line-plot-image 108.

As illustrated in FIG. 1B, the adaptive input device 12 dynamically changes to offer the user input options relevant to the task at hand. The entirety of the adaptive input device may be dynamically updated, and/or any subset of the adaptive input device may be dynamically updated. In other words, all of the depressible keys may be updated at the same time, each key may be updated independent of other depressible keys, or any configuration in between.

The user may, optionally, customize the visual appearance of the adaptive input device based on user preferences. For example, the user may adjust which key images and/or touch images are presented in different scenarios. This is explained in more detail with reference to FIGS. 3-7.

Figure 2:
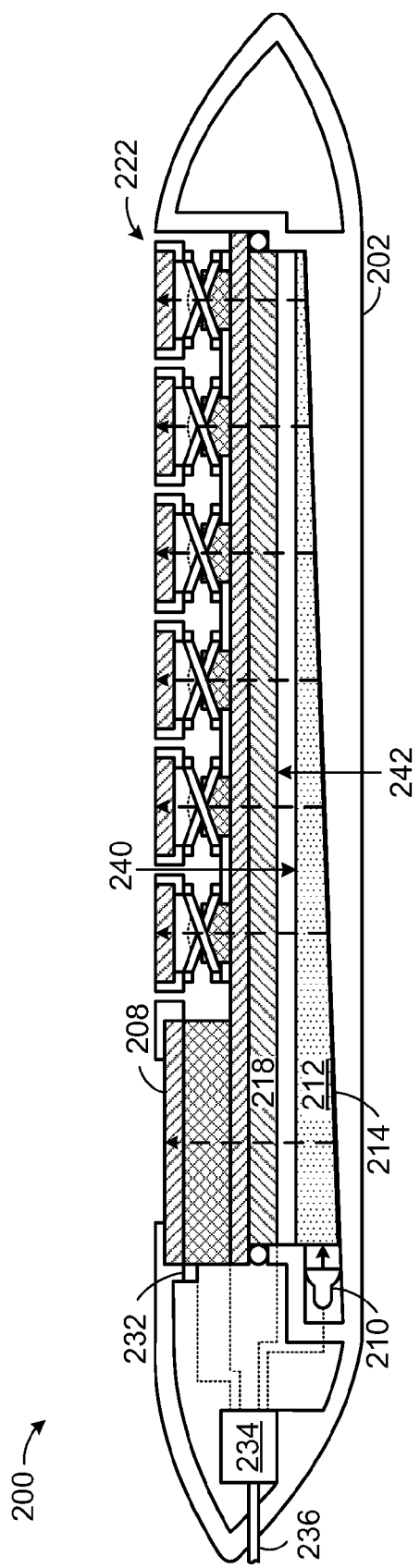
FIG. 2 is a sectional view of an adaptive keyboard in accordance with an embodiment of the present disclosure.

FIG. 2 is a sectional view of an example adaptive input device 200. The adaptive input device 200 may be a dynamic rear-projected adaptive keyboard in which images may be dynamically generated within the body 202 of adaptive input device 200 and selectively projected onto the plurality of depressible keys (e.g., depressible key 222) and/or touch regions (e.g., touch input display section 208).

A light source 210 may be disposed within body 202 of adaptive input device 200. A light delivery system 212 may be positioned optically between light source 210 and a liquid crystal display 218 to deliver light produced by light source 210 to liquid crystal display 218. In some embodiments, light delivery system 212 may include an optical waveguide in the form of an optical wedge with an exit surface 240. Light provided by light source 210 may be internally reflected within the optical waveguide. A reflective surface 214 may direct the light provided by light source 210, including the internally reflected light, through light exit surface 240 of the optical waveguide to a light input surface 242 of liquid crystal display 218.

The liquid crystal display 218 is configured to receive and dynamically modulate light produced by light source 210 to create a plurality of display images that are respectively projected onto the plurality of depressible keys, touch regions, or background areas (i.e., key images, touch images and/or background images).

The touch input display section 208 and/or the depressible keys (e.g., depressible key 222) may be configured to display images produced by liquid crystal display 218 and, optionally, to receive touch input from a user. The one or more display images may provide information to the user relating to control commands generated by touch input directed to touch input display section 208 and/or actuation of a depressible key (e.g., depressible key 222).

Touch input may be detected, for example, via capacitive or resistive methods, and conveyed to controller 234. It will be understood that, in other embodiments, other suitable touch-sensing mechanisms may be used, including vision-based mechanisms in which a camera receives an image of touch input display section 208 and/or images of the depressible keys via an optical waveguide. Such touch-sensing mechanisms may be applied to both touch regions and depressible keys, such that touch may be detected over one or more depressible keys in the absence of, or in addition to, mechanical actuation of the depressible keys.

The controller 234 may be configured to generate control commands based on the touch input signals received from touch input sensor 232 and/or key signals received via mechanical actuation of the one or more depressible keys. The control commands may be sent to a computing device via a data link 236 to control operation of the computing device. The data link 236 may be configured to provide wired and/or wireless communication with a computing device.

As described above, the touch images displayed on the depressible buttons and touch regions of an adaptive input device can be changed to visually signal changing functionality of the buttons and/or the virtual controls. In order for a user to specify a desired functionality of a depressible button or touch region, the user can select a graphical image associated with a computing function from a menu on the display.

This type of customization of an adaptive input device will now be described with respect to FIGS. 3-7.

Figure 3:
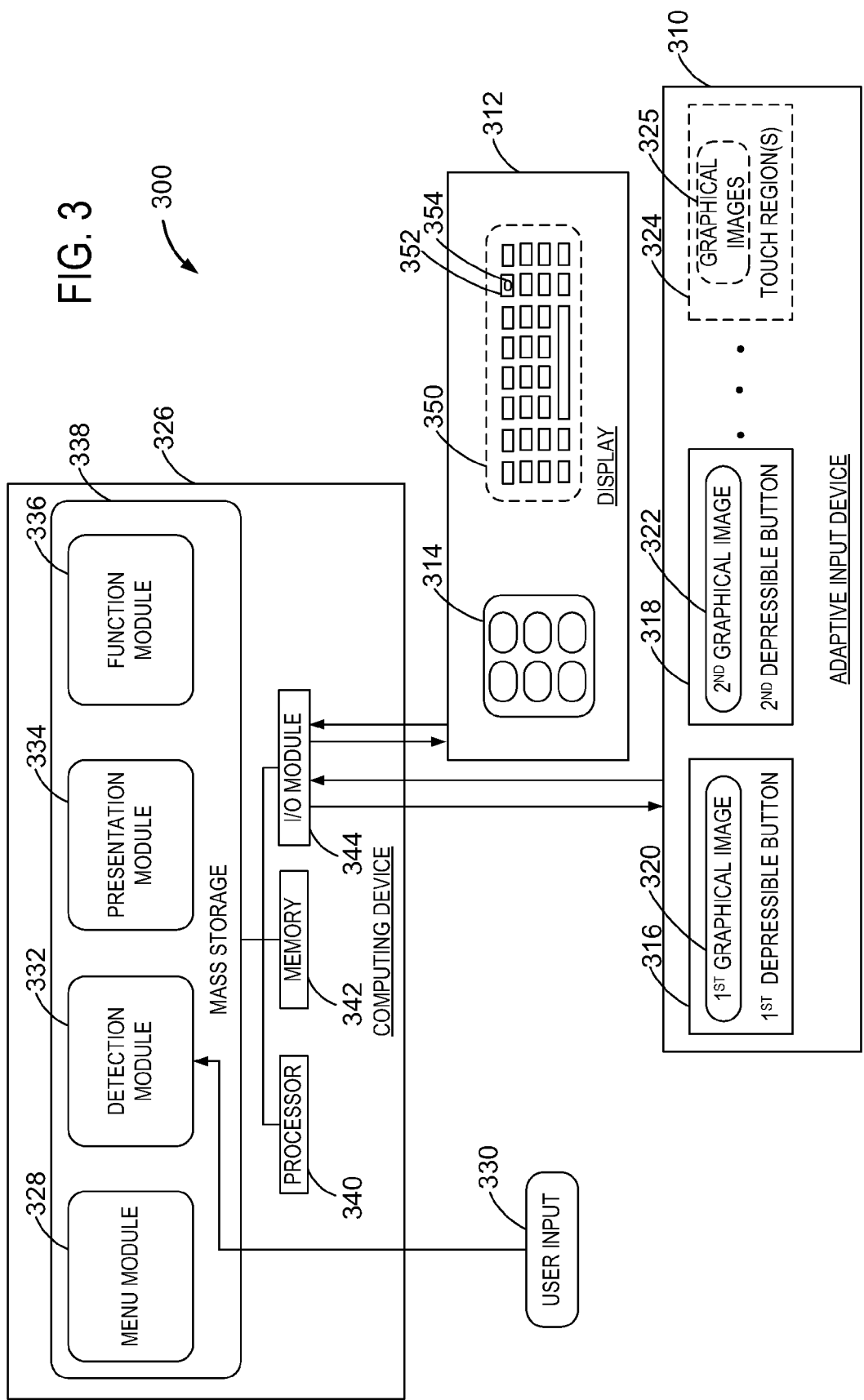
FIG. 3 is a schematic view of a system for configuring an adaptive input device.

Turning to FIG. 3, a system 300 for configuring an adaptive input device is illustrated. The system 300 includes a display 312 to display a plurality of graphical images 314. The display may optionally display a virtual adaptive input device 350 having virtual buttons, such as virtual button 352 displaying a virtual graphical image 354.

The system also includes an adaptive input device 310, such as an adaptive keyboard, having a plurality of depressible buttons, such as first depressible button 316, and second depressible button 318. The first depressible button 316 may display a first graphical image 320, and the second depressible button 318 may display a second graphical image 322. In some examples, the adaptive input device 310 also includes one or more touch regions 324, and each touch region may display one or more graphical images 325, which may optionally serve as virtual controls.

The system 300 includes a computing device 326 operatively coupled to the display 312 and the adaptive input device 310. Accordingly, the computing device 326 may include a menu module 328 for displaying the plurality of graphical images 314 on the display 312. The graphical image may be any text or graphical image displayed on the display 312. Each graphical image may be associated with a computing function. For example, the graphical images 314 may include icons for launching software applications (e.g., shortcuts, links, etc.), and/or icons for performing application-specific operations (e.g., formatting text in a word processing application, controlling a character in a gaming application, etc.). In another example, the graphical images 314 may include text, such as a character for entering textual keyboard input or a website URL for opening a webpage. Further still, the graphical images 314 may include images of a control panel or control panel sub-section.

In one example, a user may select one of the graphical images, from the plurality of graphical images 314 displayed on the display 312, for display on the adaptive input device 310. A user may indicate such a selection by providing user input 330 received at a detection module 332, via the adaptive input device 310, the display 312, and/or via a peripheral device, such as a computer mouse.

Accordingly, the computing device 326 may include a detection module 332 to detect a selected graphical image for display on a depressible button, such as first depressible button 316, of the adaptive input device 310. The detection module 332 may detect a selected graphical image for display, for example, by recognizing user selection of a graphical image via a particular series of cursor clicks or touch taps on a graphical image.

A presentation module 334 of the computing device 326 may then visually present the selected graphical image on the depressible button of the adaptive input device. The presentation module may be configured to displace a previously-displayed graphical image with the selected graphical image in some examples.

In a reconfiguration mode, the detection module 332 may be further configured to detect a selected graphical image displayed on the first depressible button 316, and via receipt of cursor control or touch input as discussed below, the presentation module 334 of the computing device 326 can visualize dragging of the selected graphical image to the second depressible button 318. Once the dragging is released, the presentation module 334 can visually present the selected graphical image on the second depressible button 318.

The computing device 326 may further include a function module 336 for executing a computing function responsive to actuation of the depressible button displaying the selected graphical image, where the computing function is associated with the selected graphical image.

It will be appreciated that the menu module 328, detection module 332, presentation module 334, function module 336, and/or some clients and various respective software components described above may be stored in a mass storage 338 and executed on a processor 340 using portions of memory 342, and may further be configured to communicate with software on other computing devices across one or more computer networks, via input/output module 344. It will further be appreciated that the computing device 326 may include one or more remote devices interoperating across one or more computer networks (e.g., Local area network, Internet, etc.), and the components of menu module 328, detection module 332, presentation module 334, function module 336, and/or some clients may be implemented on these distributed devices.

Figure 4:
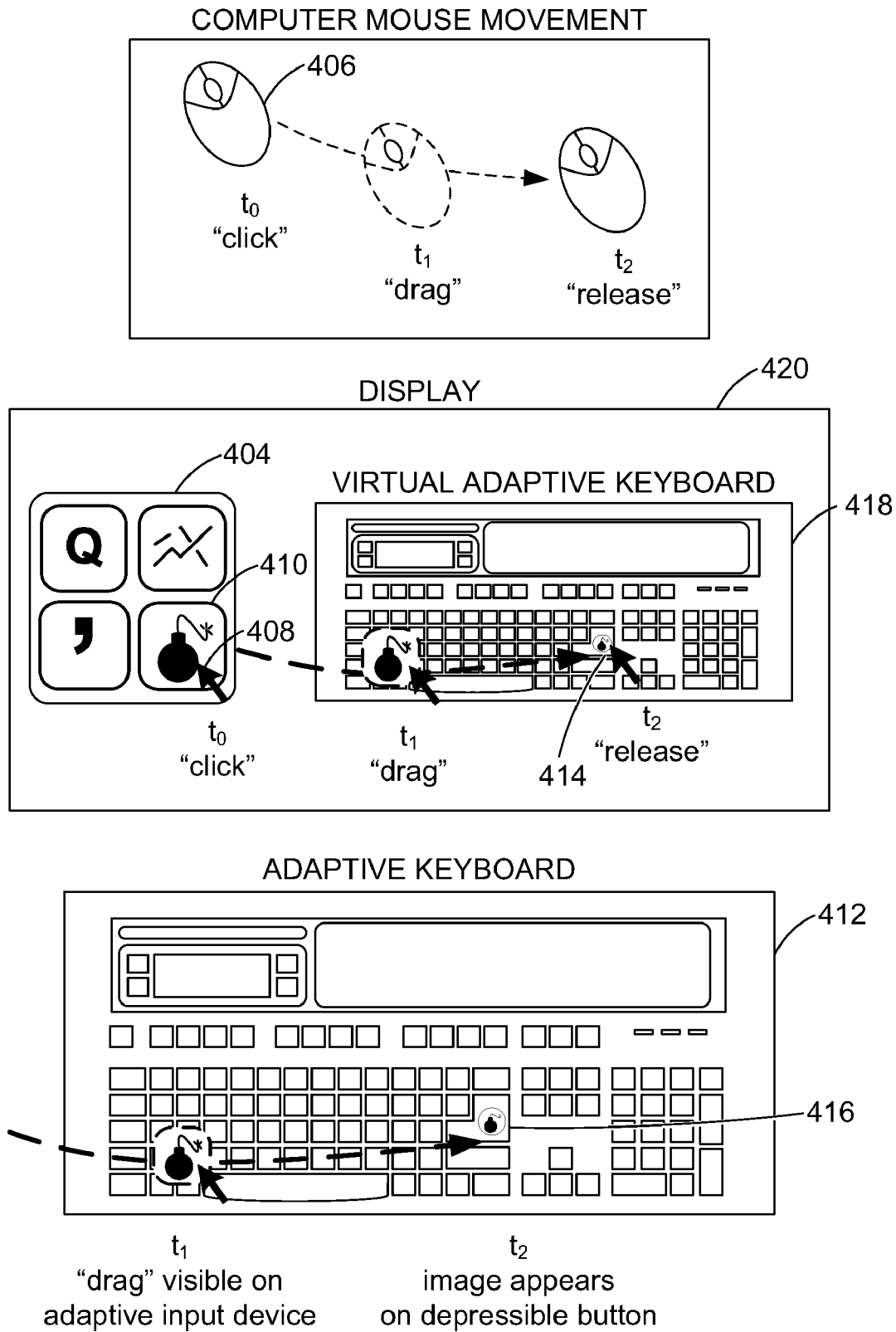
FIG. 4 somewhat schematically shows the dragging of a graphical image onto a virtual adaptive keyboard on a display for display on an adaptive keyboard.

FIG. 4 somewhat schematically shows an exemplary process for configuring an adaptive input device. FIG. 4 shows a peripheral input device, such as a computer mouse 406, which may be moved by the user in order to control a cursor 408 on the display 420. In this example, the display 420 presents a menu 404 of graphical images and a virtual adaptive keyboard 418, where the virtual buttons of virtual adaptive keyboard 418 correspond to depressible buttons of an actual adaptive keyboard 412.

One way to customize an adaptive keyboard 412 includes assigning images to buttons of the adaptive keyboard 412 via virtual buttons of a virtual adaptive keyboard 418 on display 420. For example, user input may indicate selection of, for example, bomb-image icon 410 from the menu 404 for assignment to depressible button 416 of adaptive keyboard 412 by dragging and dropping bomb-image icon 410 onto virtual button 414 of virtual adaptive keyboard 418.

As shown at $t_0$, the computer mouse 406 may be clicked while the cursor 408 is hovering on bomb-image icon 410 on display 420. A computer mouse click may indicate selection of the bomb-image icon 410. In one example, a detection module of a computing device may detect the selected graphical image responsive to a cursor click command executed at to while a cursor is located within a target hit region (e.g., within the outer outline) of the selected graphical image. Thus, bomb-image icon 410 may be grabbed by the cursor 408 at $t_0$.

As shown by the position of the computer mouse 406 at $t_1$, the user may move the computer mouse 406 to thereby drag the bomb-image icon 410 on the display 420 and across the virtual adaptive keyboard 418 on the display 420. When the bomb-image icon 410 is dragged across the virtual adaptive keyboard 418, a presentation module of a computing device operatively coupled to the display 420 and adaptive keyboard 412 may display the movement of the bomb-image icon 410 with the cursor 408 as the cursor drags 408 across the display 420. Furthermore, the dragging of the bomb-image icon 410 may be optionally visualized on the actual adaptive keyboard 412, as shown at $t_1$ on the actual adaptive keyboard 412.

The computer mouse 406 may be moved to a final position at $t_2$ corresponding to a position where the cursor 408 is hovering over virtual button 414 of the virtual adaptive keyboard 418 on display 420. Accordingly, when the mouse click is released at $t_2$, the cursor's grab on the bomb-image icon 410 may be released, and the bomb-image icon 410 can be displayed on the depressible button 416 of the adaptive keyboard 412.

In one example, after release of the bomb-image icon 410 at virtual button 414, the presentation module described above may visually present the bomb-image icon 410 on the virtual button 414 of the virtual adaptive keyboard 412 and on the actual adaptive keyboard 412. If a previous graphical image was displayed on depressible button 416, the presentation module may display the bomb-image icon 410 in place of the previous graphical image. Thereafter, actuation of depressible button 416 displaying bomb-image icon 410 may result in an execution of a computing function (e.g., "drop a bomb") associated with the bomb-image icon 410.

Turning now to FIG. 5, the illustration somewhat schematically shows an alternate embodiment for an exemplary process for configuring an adaptive input device, such as adaptive keyboard 510.

A display 514 illustrates a menu 504 including a plurality of selectable graphical images, or icons. As shown at t0, a computer mouse 506 may be clicked while a cursor 508 is hovering over a bomb-image icon 512 on display 514. A computer mouse click may indicate selection of the bomb-image icon 512 by the cursor 508. The computer mouse click may be detected as user input by a detection module of a computing device operatively coupled to the adaptive keyboard 510 when the cursor 508 is clicked while the cursor is located within a target hit region (e.g., within the outer outline) of the bomb-image icon 512.

As shown at t1, the computer mouse 506 may be moved by the user to thereby drag the bomb-image icon 512 on the display 514. At $t_2$, the computer mouse 506 is moved further, to drag the cursor 508 and bomb-image icon 512 to the adaptive keyboard 510. When the bomb-image icon 512 is dragged to, and across, the adaptive keyboard 510, a presentation module of a computing device operatively coupled to the display 514 and adaptive keyboard 510 may display the movement of the bomb-image icon 512 with (or without) the cursor 508 as the cursor 508 drags across the display 514. That is, the presentation module of the computing device may visualize a dragging of the selected graphical image across the display 514, off of the display 514, onto the adaptive keyboard 510, and across the adaptive keyboard 510.

From $t_2$ to $t_3$, the cursor 508 and bomb-image icon 512 may be dragged across other depressible buttons, thereby dynamically covering and uncovering other graphical images on other depressible buttons of the adaptive keyboard 510. The computer mouse 506 may be moved to a final position, shown at $t_3$, corresponding to a position where the cursor 508 is hovering over depressible button 516 of the adaptive keyboard 510. Accordingly, when the cursor click command is released at $t_3$, the presentation module may then visually present the selected graphical image on the depressible button 516.

Figure 6:
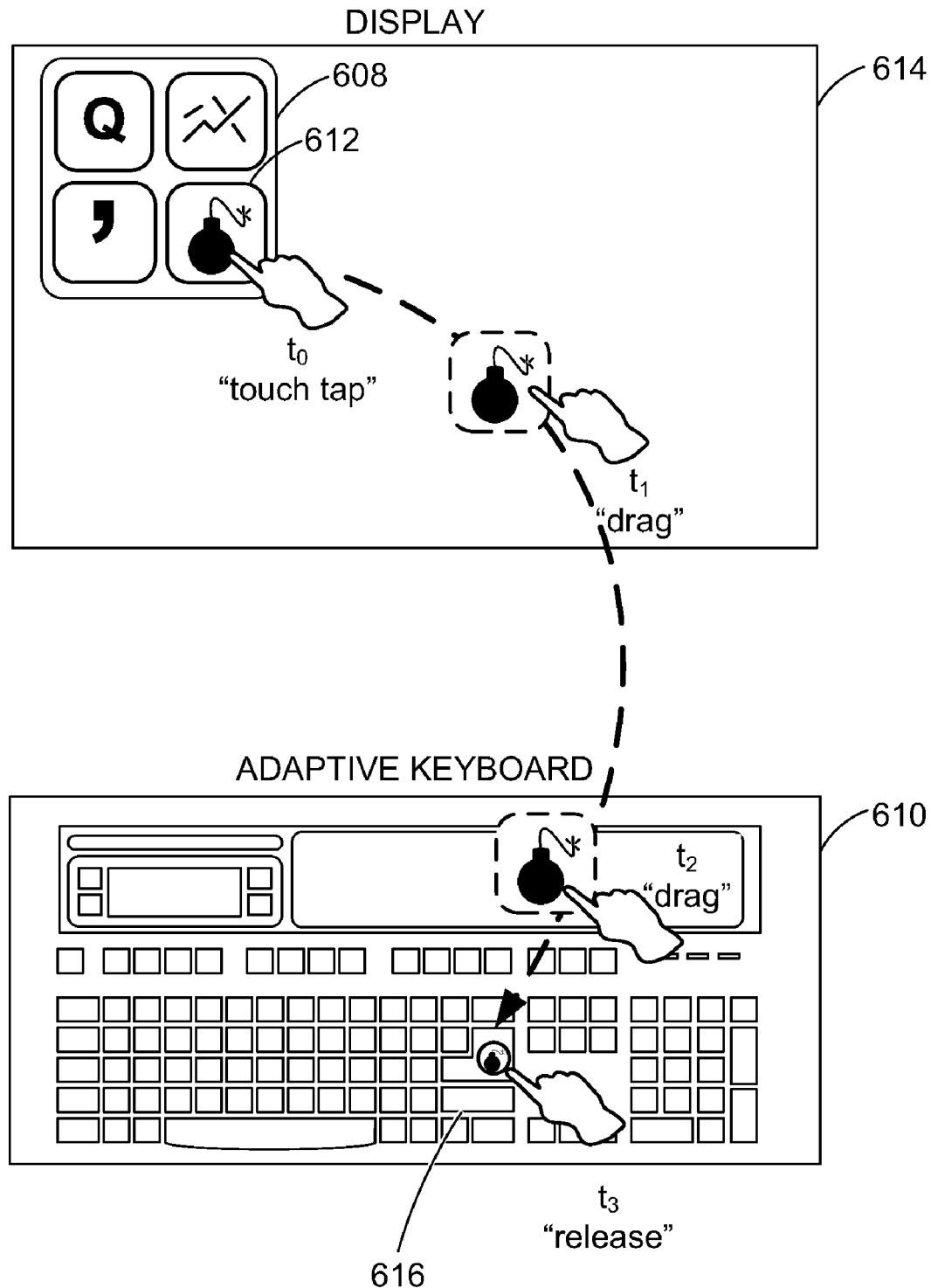
FIG. 6 somewhat schematically shows the dragging of a graphical image from a display to an adaptive input device, via a touch input.

FIG. 6 somewhat schematically shows an exemplary process for configuring an adaptive input device, such as adaptive keyboard 610, using touch input.

A display 614 illustrates a menu 608 including a plurality of selectable graphical images, or icons. At $t_0$, a user may select bomb-image icon 612 on display 614 via a touch tap command, and this selection may be detected by a detection module of a computing device operatively coupled to adaptive keyboard 610 if the touch tap is directed at a target hit region of the bomb-image icon 612.

The user may then drag the bomb-image icon 612, via touch input, across and off of the display 614, as shown at $t_1$. A presentation module of a computing device operatively coupled to the display and/or adaptive keyboard 610 may visualize the dragging of the selected graphical image across and off of the display 614.

From $t_1$ to $t_2$, the user may drag the bomb-image icon 612 off of the display 614 and onto the adaptive keyboard 610. From $t_2$ to $t_3$, the bomb-image icon 612 can be moved across the adaptive keyboard 610 to a depressible button 616 of the adaptive keyboard 610. In this example, the presentation module may visualize the movement of the bomb-image icon 612 as the touch gesture drags across the display 614 and the adaptive keyboard 610.

The user may drag the touch input to a final position at $t_3$, where the touch input is hovering over depressible button 616 of the adaptive keyboard 610. Accordingly, when the user removes the touch input, the bomb-image icon 612 may be released from the dragging. Then, the presentation module may visually present the selected graphical image on the depressible button 616 of adaptive keyboard 610. Thereafter, actuation of depressible button 616 may result in an execution of a computing function associated with the bomb-image icon 612.

It may be appreciated that the drag-and-drop technique for assigning selected graphical images to depressible buttons and/or touch regions of an adaptive input device as described with respect to FIGS. 4-6 is an exemplary technique and is not exclusive. In another example, selected graphical images may be assigned to depressible buttons and/or touch regions of an adaptive input device by selecting a graphical image for assignment with a peripheral input device, or via touch input, where the selection triggers a pop-up of a virtual adaptive input device with selectable virtual buttons.

It may be further appreciated that if an adaptive input device includes a touch region, the detection module of an associated computing device may be configured to detect a second selected graphical image from the plurality of graphical images on a display, for display on the touch region. Accordingly, a presentation module of a computing device operatively coupled to the adaptive input device may be configured to visually present the second selected graphical image on the touch region of the adaptive input device.

Turning now to FIG. 7, a flowchart illustrates a method 700 for configuring an adaptive input device operatively coupled to a computing device. In this exemplary flowchart, it is to be understood that the computing device is coupled to a display, such as display 312 of FIG. 3.

At 710, the method includes displaying, on the display, a plurality of graphical images, each graphical image being associated with a computing function. In one example, a graphical menu including a plurality of graphical images is displayed on a display.

At 712, the method includes detecting user input of a selected graphical image from the plurality of graphical images, for display on a depressible button of the adaptive input device.

As illustrated schematically in FIGS. 4 and 5, detecting user input may include detecting the selected graphical image responsive to a cursor click command being executed while a cursor is located within a target hit region of the selected graphical image. Alternately, as illustrated schematically in FIG. 6, detecting user input may include detecting the selected graphical image responsive to a touch tap command within a target hit region of the selected graphical image.

At 714, the method may include visually presenting a dragging of the selected graphical image across the display, off of the display, onto an adaptive input device, and across the adaptive input device to the depressible button. As described above, the dragging may include the selected graphical image dynamically covering and uncovering other graphical images on other depressible buttons of the adaptive input device as the selected graphical image drags across the other depressible buttons. At 716, the method may include releasing the dragging of the selected graphical image at the depressible button to display (e.g., visually present) the selected graphical image on the depressible button at 718.

In one example, if an adaptive input device has a plurality of buttons including a first depressible button and a second depressible button, and the system (or components of the system) is in a reconfiguration mode, a graphical image can be moved from one depressible button to another. That is, the detecting of step 712 can include detecting a selected graphical image displayed on the first depressible button, and the presenting of step 718 can include visually presenting the selected graphical image on the second depressible button.

Further, it may be appreciated that if an adaptive input device has a touch region, the detecting of step 712 may also include detecting user input of a second selected graphical image from the plurality of graphical images for display on the touch region. Accordingly, the presenting of step 718 may include presenting the second selected graphical image at the touch region.

As indicated by the dotted lines, the method 700 may alternately include visually presenting a dragging of the selected graphical image across the display to a virtual button of a virtual adaptive input device displayed on the display at 722, where the virtual button corresponds to the depressible button of the adaptive input device. This alternate method may further include releasing the dragging of the selected graphical image at the virtual button to display on the selected graphical image the virtual button at 724, and presenting the selected graphical image on the virtual button and the associated depressible button of the actual adaptive input device at 726.

Thus, at 720, the method includes executing a computing function responsive to actuation of the depressible button displaying the selected graphical image. As described above, the computing function is associated with the selected graphical image such that a graphical image can be moved to be displayed from a display to a depressible button, from a display to a touch region, from one depressible button to another and/or from one touch region to another, yet upon actuation of the key or touch region displaying the selected graphical image the computing function associated with the selected graphical image is executed.

It may be appreciated that the dragging of a selected graphical image as described herein may be a dragging of a copy of the selected graphical image, where the original graphical image or an additional copy of the graphical image is left at the original location. That is, if a graphical image is dragged from the display to the adaptive input device, the dragging may be visualized as a dragging of a copy of the selected graphical image across the display, off the display, onto the adaptive input device, and across depressible buttons of the adaptive input device, while the graphical image is also displayed on the display. Furthermore, the release of the dragging may result in a copy of the selected graphical image being visualized at the depressible button, where the selected graphical image is also displayed on the display at the original location of the selected graphical image. Alternately, a dragging of the selected graphical image may be a dragging of the actual selected graphical image, where a copy of the selected graphical image is not left at the original location.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for configuring an adaptive input device, the system comprising:
   a computing device operatively coupled to the adaptive input device and a display device separate from the adaptive input device, the adaptive input device including a plurality of depressible buttons, each button having a depressible key face configured to receive an image dynamically generated within the adaptive input device and to display that image to a user of the adaptive input device, the computing device including:
   a menu module configured to display a plurality of graphical images on the display device, each graphical image associated with a computing function;
   a detection module configured to detect which of the plurality of graphical images displayed is selected by the user for display on a depressible button of the adaptive input device; and
   a presentation module configured to visually present the selected graphical image on the depressible button by causing that image to be generated within the adaptive input device and projected onto the depressible key face of that button, and to visually present a dragging of the selected graphical image across the display device, off of the display device, onto the adaptive input device, and across the adaptive input device to the depressible button of the adaptive input device.

2. The system of claim 1, where the dragging includes dragging the selected graphical image across the display device to a virtual button of a virtual adaptive input device displayed on the display device, the virtual button corresponding to the depressible button of the adaptive input device.

3. The system of claim 1, where the dragging includes the selected graphical image dynamically covering and uncovering other graphical images on other depressible buttons of the adaptive input device as the selected graphical image drags across the other depressible buttons.

4. The system of claim 1, where the computing device further includes a function module for executing a computing function in response to mechanical actuation of the depressible button displaying the selected graphical image, the computing function being associated with the selected graphical image.

5. The system of claim 1, where the plurality of depressible buttons includes a first depressible button and a second depressible button, and where, in a reconfiguration mode, the detection module is configured to detect which graphical image is displayed on the first depressible button, and the presentation module is configured to visually present that image on the second depressible button.

6. The system of claim 1, where the adaptive input device further includes a touch region, and where the detection module is configured to detect a second selected graphical image from the plurality of graphical images for display on the touch region, and the presentation module is configured to visually present the second selected graphical image on the touch region.

7. The system of claim 1, where the detection module detects the selected graphical image responsive to a cursor click command being executed while a cursor is located within a target hit region of the selected graphical image, and where the presentation module moves the selected graphical image with the cursor as the cursor drags across the display device and the adaptive input device.

8. The system of claim 1, where the detection module detects the selected graphical image responsive to a touch tap command being directed at a target hit region of the selected graphical image, and where the presentation module moves the selected graphical image with a touch gesture as the touch gesture drags across the display device and the adaptive input device.

9. A method for configuring an adaptive input device operatively coupled to a computing device, the method comprising:
 causing a plurality of graphical images to be displayed on a display separate from the adaptive input device, each graphical image associated with a computing function;
 detecting which of the plurality of graphical images displayed is selected by a user of the adaptive input device for display on a depressible button of the adaptive input device, the adaptive input device including a plurality of depressible buttons, each button having a depressible key face configured to receive an image dynamically generated within the adaptive input device and to display that image to a user of the adaptive input device;
 visually presenting a dragging of the selected graphical image where the dragging includes the selected graphical image dynamically covering and uncovering other graphical images on other depressible buttons of the adaptive input device as the selected graphical image drags across the other depressible buttons; and
 causing the selected graphical image to be presented on the depressible button by causing that image to be generated within the adaptive input device and projected onto the depressible key face of that button.

10. The method of claim 9, further comprising:
 visually presenting a dragging of the selected graphical image across the display, off of the display, onto the adaptive input device, and across the adaptive input device to the depressible button; and
 releasing the dragging of the selected graphical image at the depressible button to display the selected graphical image on the depressible button.

11. The method of claim 9, further comprising:
 executing a computing function responsive to actuation of the depressible button displaying the selected graphical image, the computing function being associated with the selected graphical image.

12. The method of claim 9, where the adaptive input device includes a first depressible button and a second depressible button, and where, in a reconfiguration mode, detecting which image is selected includes detecting the image displayed on the first depressible button, and where causing the selected image to be presented includes causing the image from the first depressible button to be presented on the second depressible button.

13. The method of claim 9, where the adaptive input device further includes a touch region, where detecting includes detecting user input of a second selected graphical image from the plurality of graphical images for display on the touch region and where the second selected graphical image is presented at the touch region.

14. The method of claim 9, where detecting user input includes detecting the selected graphical image responsive to a cursor click command being executed while a cursor is located within a target hit region of the selected graphical image.

15. The method of claim 9, where detecting user input includes detecting the selected graphical image responsive to a touch tap command within a target hit region of the selected graphical image.

16. The method of claim 9, further comprising:
 visually presenting dragging the selected graphical image across the display to a virtual button of a virtual adaptive input device displayed on the display, the virtual button corresponding to the depressible button of the adaptive input device;
 releasing the dragging of the selected graphical image at the virtual button to display the selected graphical image on the virtual button.

17. A method for configuring an adaptive input device coupled to a computing device, the method comprising:
 causing a graphical menu to be displayed on a display separate from the adaptive input device, the menu including a plurality of graphical images, each graphical image associated with a computing function;
 detecting, at the computing device, which of the plurality of graphical images displayed is selected by a user of the adaptive input device for display on a depressible button of the adaptive input device;
 visually presenting a dragging of the selected graphical image across the display, off of the display, onto the adaptive input device, and across the adaptive input device to a depressible button of the adaptive input device, the dragging including dynamically covering and uncovering graphical images on the display and on the adaptive input device;
 releasing the dragging of the selected graphical image at the depressible button of the adaptive input device;
 causing the selected graphical image to be presented on the depressible button by causing that image to be generated within the adaptive input device and projected onto a depressible key face of that button; and
 executing the computing function associated with the selected graphical image responsive to actuation of the depressible button.

18. The method of claim 17, further comprising detecting a second graphical image selected by the user, and causing the second graphical image to be visually presented on a touch region of the adaptive input device.

* * * * *